United States Patent

Kubo et al.

(10) Patent No.: US 9,575,909 B2
(45) Date of Patent: Feb. 21, 2017

(54) RECORDING APPARATUS

(71) Applicant: Sony Corporation, Tokyo (JP)

(72) Inventors: Takeshi Kubo, Kanagawa (JP); Takeharu Takasawa, Kanagawa (JP); Naofumi Goto, Kanagawa (JP); Seiji Kobayashi, Kanagawa (JP); Kenichi Kawasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/494,717

(22) Filed: Sep. 24, 2014

(65) Prior Publication Data

US 2015/0095593 A1 Apr. 2, 2015

(30) Foreign Application Priority Data

Oct. 1, 2013 (JP) ................................. 2013-206644

(51) Int. Cl.
| G06F 13/16 | (2006.01) |
| H01P 5/00 | (2006.01) |
| H01P 3/12 | (2006.01) |
| H01P 5/107 | (2006.01) |
| H04B 3/52 | (2006.01) |
| H01P 3/00 | (2006.01) |
| H04B 5/00 | (2006.01) |

(52) U.S. Cl.
CPC ............. G06F 13/1668 (2013.01); H01P 3/00 (2013.01); H01P 3/12 (2013.01); H01P 5/00 (2013.01); H01P 5/107 (2013.01); H04B 3/52 (2013.01); H04B 5/0037 (2013.01); H04B 5/0075 (2013.01)

(58) Field of Classification Search
CPC ...... G06F 1/184; G06F 1/187; G06F 12/0246; G06F 2212/7201; G06F 2212/7206; G11B 33/126; G11B 33/128; G11B 23/08714; G11B 31/00; H01P 1/11; H01P 1/161; H01P 1/06; H01P 3/00; H05K 5/0021; H05K 7/1435; Y10S 336/01; Y10S 505/70; Y10S 505/866; Y10S 505/879; H04B 1/034; H04B 1/205; H04B 5/0031; H04B 5/0037; H04B 5/0075; H01L 25/0657; Y02B 60/1225

See application file for complete search history.

(56) References Cited

U.S. PATENT DOCUMENTS

| 5,413,983 | A | * | 5/1995 | Stern et al. .................... 505/211 |
| 5,913,926 | A | * | 6/1999 | Anderson et al. ........... 714/6.24 |
| 6,301,513 | B1 | * | 10/2001 | Divon et al. .................... 700/94 |
| 9,287,903 | B2 | * | 3/2016 | Takeda .................. H04B 1/034 |
| 2002/0109558 | A1 | * | 8/2002 | Kanamaluru ............... 333/21 A |
| 2004/0255091 | A1 | * | 12/2004 | Justo et al. .................... 711/162 |

(Continued)

FOREIGN PATENT DOCUMENTS

JP 2011-126244 A 5/1999

*Primary Examiner* — Dionne H Pendleton
(74) *Attorney, Agent, or Firm* — Wolf, Greenfield & Sacks, P.C.

(57) ABSTRACT

A recording apparatus includes a recording unit, a waveguide forming unit, a communication unit, and a memory controller. The recording unit is configured to record and hold data. The waveguide forming unit is configured to function as a transmission path that transmits the data. The communication unit is configured to communicate with the waveguide forming unit. The memory controller is configured to control input and output of the data to and from the recording unit.

7 Claims, 13 Drawing Sheets

(56) References Cited

U.S. PATENT DOCUMENTS

| | | | |
|---|---|---|---|
| 2005/0147414 A1* | 7/2005 | Morrow | G06F 13/1668 398/142 |
| 2009/0002746 A1* | 1/2009 | Niwa et al. | 358/1.15 |
| 2009/0318815 A1* | 12/2009 | Barnes et al. | 600/473 |
| 2012/0217658 A1* | 8/2012 | Kuroda | 257/777 |
| 2013/0046917 A1* | 2/2013 | Yang | G06F 12/0246 711/103 |

* cited by examiner

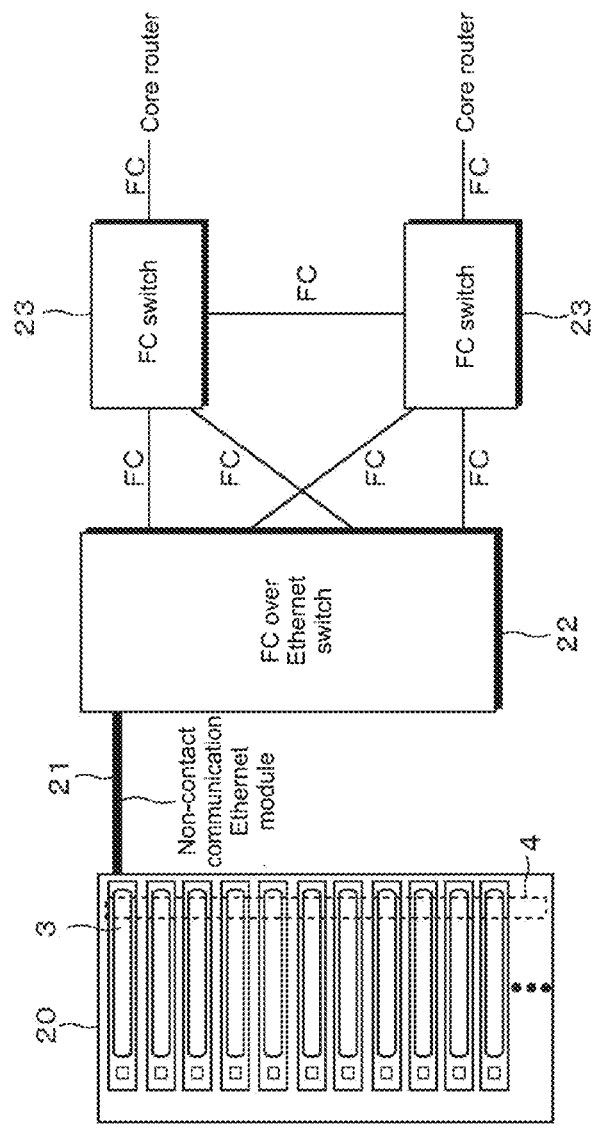
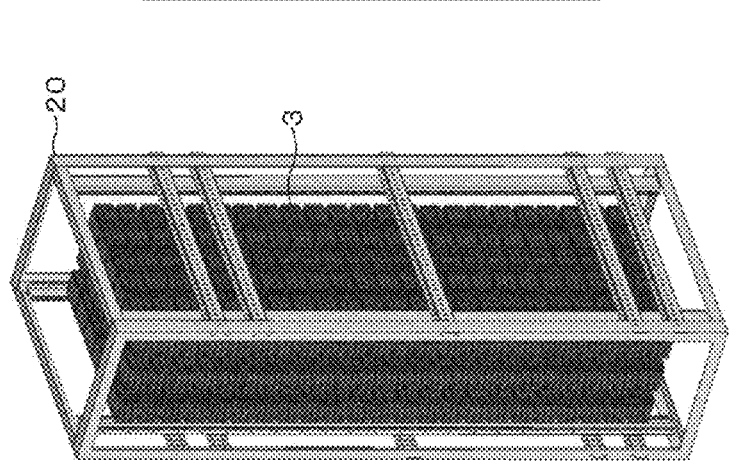
FIG.3B
FIG.3A

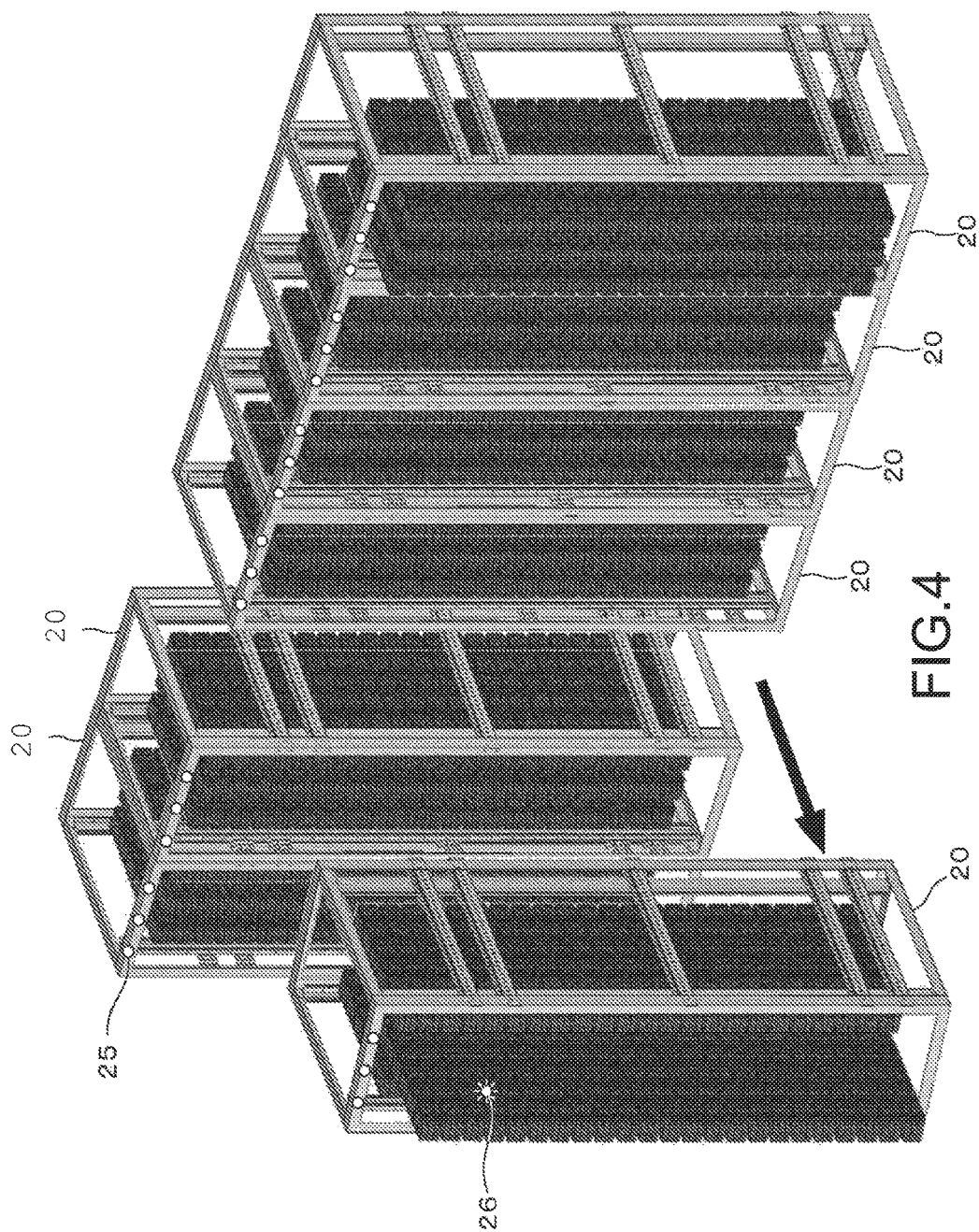

200

RECORDING APPARATUS

CROSS REFERENCE TO RELATED APPLICATIONS

This application claims the benefit of Japanese Priority Patent Application JP 2013-206644 filed Oct. 1, 2013, the entire contents of which are incorporated herein by reference.

BACKGROUND

The present disclosure relates to a recording apparatus.

These days, recording apparatuses each containing a flash semiconductor memory and the like include recording apparatuses called an SD (Secure Digital) card, a USB (Universal Serial Bus) memory, an HDD (Hard Disc Drive) containing a plurality of semiconductor memory chips, an SSD (Solid State Drive) with attachment compatibility, and the like (see Japanese Patent Application Laid-open No. Hei 11-126244).

SUMMARY

Since it is assumed that those recording apparatuses are connected to a network or another apparatus by physical connection such as insertion and removal of connectors, there arises a problem that durability of the connectors exposed to the outside is low. Further, the durability of the connectors against the insertion and removal also has a problem. Additionally, there are problems of static electricity, corrosion of a connector portion, and the like. When those problems are caused, communication with a network or another apparatus is not available.

In view of such problems, it is desirable to provide a recording apparatus that does not cause failures in communication due to deterioration and the like of a connector.

According to an embodiment of the present disclosure, there is provided a recording apparatus including a recording unit, a waveguide forming unit, a communication unit, and a memory controller. The recording unit is configured to record and hold data. The waveguide forming unit is configured to function as a transmission path that transmits the data. The communication unit is configured to communicate with the waveguide forming unit. The memory controller is configured to control input and output of the data to and from the recording unit.

According to the present disclosure, it is possible to achieve a recording apparatus that does not cause unavailability of communication or failures in communication due to deterioration and the like of a connector.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 3A is a diagram showing a second outer appearance example of the rack system using the data bus system, and FIG. 3B is a block diagram showing a configuration of the rack system of the second example;

FIG. 4 is an outer appearance view of a data center including a plurality of rack systems;

DETAILED DESCRIPTION OF EMBODIMENTS

Hereinafter, an embodiment of the present disclosure will be described with reference to the drawings. It should be noted that description is given in the following order.

(1. Embodiment)
(1-1. Configuration of Data Bus System)
(1-2. Configuration of Recording Apparatus)
(1-3. Connection between Bus and Recording Apparatus)
(2. Modified Example)

1. Embodiment

1-1. Configuration of Data Bus System

Figure 1:
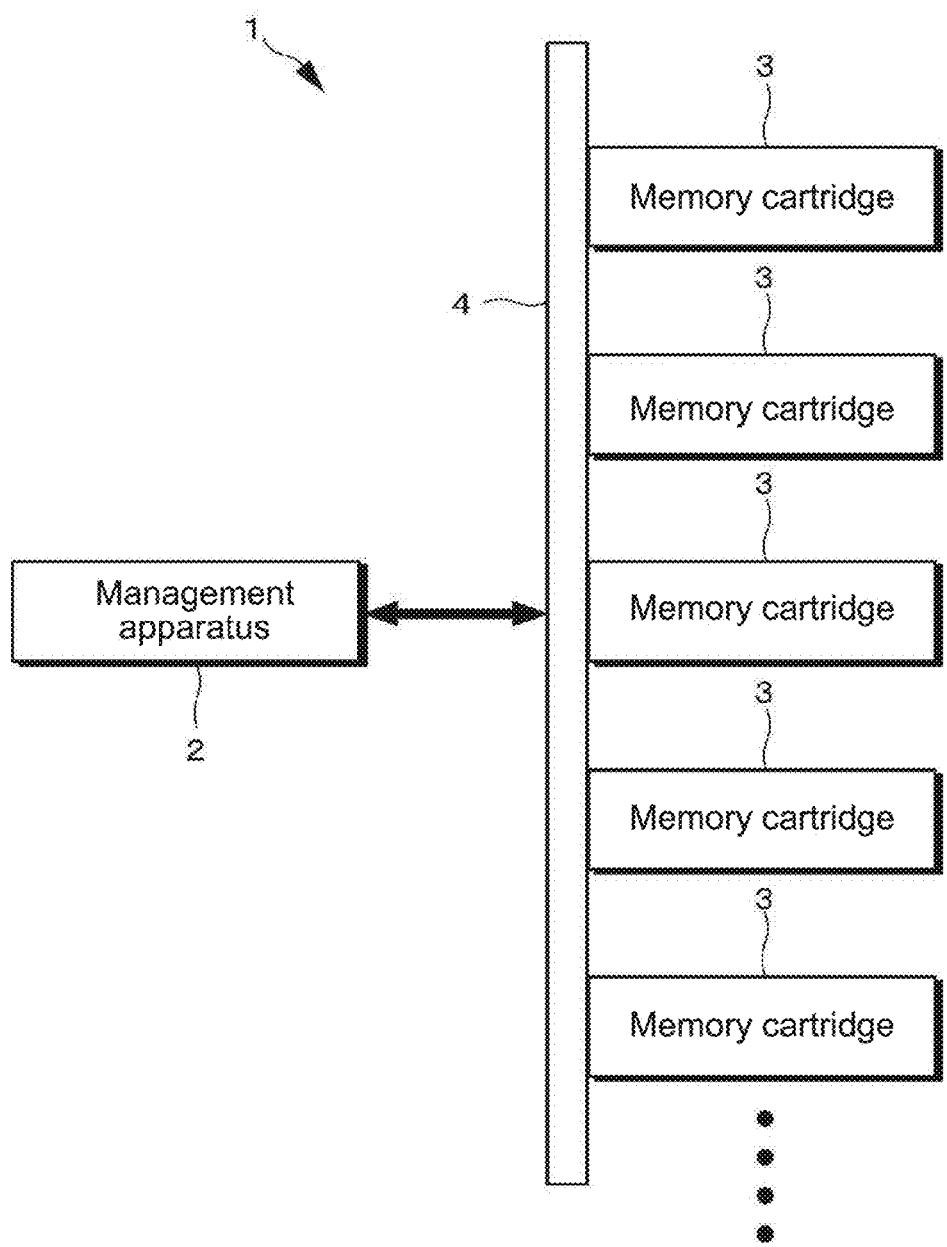
FIG. 1 is a block diagram showing a configuration of a data bus system.

First, description will be given on the configuration of a data bus system 1 in which a memory cartridge serving as a recording apparatus according to this embodiment is used. FIG. 1 is a block diagram showing a configuration of the data bus system 1. The data bus system 1 includes a management apparatus 2, a plurality of memory cartridges 3, 3, 3, . . . , each of which serves as a recording apparatus, and a waveguide 4 serving as a bus.

The management apparatus 2 is an information processing apparatus such as a personal computer including a control unit, a storage unit, an input unit, and the like. The control unit includes a CPU (Central Processing Unit), a RAM (Random Access Memory), a ROM (Read Only Memory), and the like. The storage unit stores and holds various types of data, programs, and the like. The input unit receives an input from a user.

The ROM stores a program read and operated by the CPU, and the like. The RAM is used as a work memory of the CPU. The CPU executes various types of processing according to a program stored in the ROM and issues commands, to manage and control the management apparatus 2 itself, the whole of the data bus system 1, and each of the memory cartridges 3.

The waveguide 4 as a bus functions as a transmission path between the management apparatus 2 and the plurality of memory cartridges 3. In the present disclosure, communication between the waveguide 4 and the memory cartridges 3 is performed by wireless communication using a microwave band or a millimeter-wave band.

Microwaves are radio waves having a frequency of about 300 MHz to about 300 GHz and a wavelength of about 1 m to 100 µm. Further, millimeter waves are radio waves having a frequency of about 30 to 300 GHz and a wavelength of about 1 to 10 mm. Use of the microwaves or millimeter waves having a high frequency allows wireless communication at a high-speed data rate.

Characteristics of the microwaves or millimeter waves are as follows: because of the short wavelength thereof, downsizing of an antenna or the like is achieved; because of high directivity thereof, the radio waves can be transmitted to only a direction of the other party of communication, and an interference of the radio waves to another direction can be suppressed; and the like. So, it is possible to efficiently perform data communication without interference between devices in a space.

In the present disclosure, the waveguide 4, which is a high-frequency transmission line, is used as a bus. The waveguide is a metallic pipe that has a circular or rectangular cross section and is used for transmitting light, radio waves, and the like. The radio waves propagate in the waveguide while forming an electromagnetic field in the waveguide, the electromagnetic field corresponding to the shape, dimension, or wavelength (frequency) of the waveguide.

In the present disclosure, each of the memory cartridges 3 includes a waveguide forming unit 501, and the plurality of memory cartridges 3 are stacked on one another and the waveguide forming units 501 of the plurality of memory cartridges 3 are coupled to one another. Thus, the waveguide 4 is formed. The configuration of the waveguide 4 will be described later in detail.

The memory cartridge 3 is a cartridge including a built-in flash semiconductor memory capable of recording and holding data and outputting the data to the outside, for example. The memory cartridge 3 communicates with the waveguide 4 serving as a bus by wireless communication using the microwaves or millimeter waves.

The data bus system 1 is configured as described above. The data bus system 1 is used for a system such as a large-scale server, a data center, and a cloud computing data center.

Next, a specific example using the data bus system 1 will be described while taking as an example a rack system used as a data center or the like.

Figure 2A:
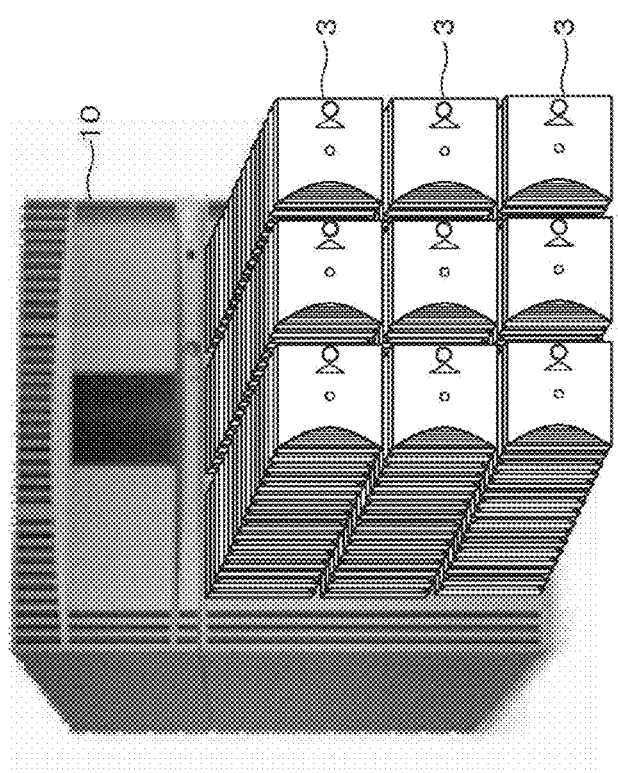
FIG. 2A is a diagram showing a first outer appearance example of a rack system using the data bus system.

FIG. 2A is a diagram showing a first outer appearance example of a rack system using the data bus system 1. In the example of FIG. 2A, a total of 252 memory cartridges 3, which are arranged in 3 columns by 3 rows at the depth of 28 memory cartridges 3, are accommodated in a rack 10. Note that the number of memory cartridges 3 is merely one example and is not limited to the number described above. The waveguide 4 serving as a bus is formed by stacking of the memory cartridges 3 accommodated in the rack.

Figure 2B:
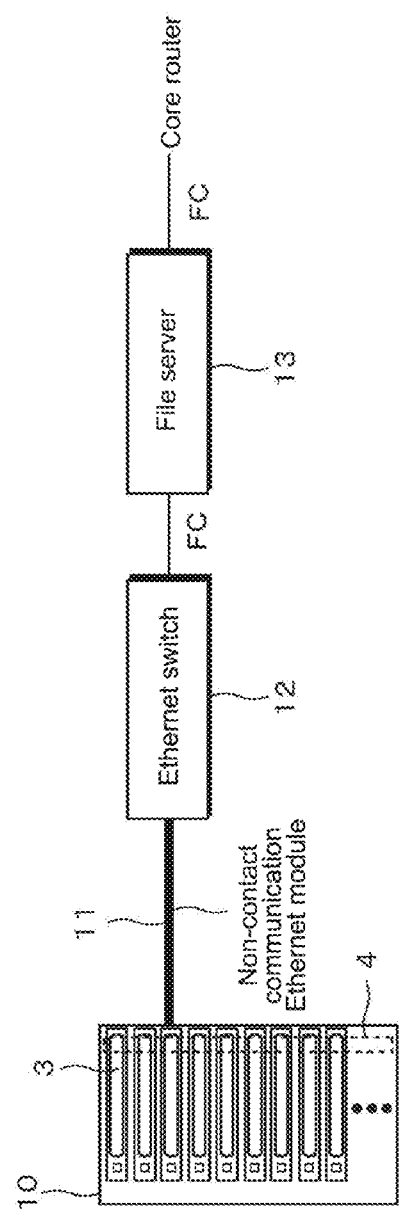
FIG. 2B is a block diagram showing a configuration of the rack system of the first example.

FIG. 2B is a diagram showing a configuration of the rack system using the data bus system 1. The waveguide 4 serving as a bus, which is provided to the back surface or the like of the rack 10, is connected to an Ethernet switch 12 via a non-contact communication Ethernet module 11. The Ethernet switch 12 is a relay device that is connected to an external device in a wired or wireless manner and transmits and receives data. The Ethernet switch 12 is connected to a file server 13 via an FC (Fiber Channel). Further, the file server 13 is connected to a core router via the FC. The core router is a router used for transmitting and relaying data in a core network and used in a large-scale data center, a communication system, and the like.

FIG. 3A is a diagram showing a second outer appearance example of the rack system using the data bus system 1. In the example of FIG. 3A, 3 columns each including 414 (252+162) memory cartridges 3 vertically arranged are accommodated side by side in a rack 20. Note that the number of memory cartridges 3 is merely one example and is not limited to the number described above. The waveguide 4 serving as a bus is formed by stacking of the memory cartridges 3 accommodated in the rack.

FIG. 3B is a diagram showing a configuration of the rack system using the data bus system 1. The waveguide 4 and an Ethernet switch 22 are connected to each other by a non-contact communication Ethernet module 21. The Ethernet switch 22 and FC switches 23 are connected to one another via FCs. Further, the FC switches 23 are connected to core routers via the FCs.

The network in such a rack system is established using a VLAN (Virtual Local Area Network), for example. An IP (Internet Protocol) address is assigned to each of the memory cartridges 3. With use of the IP addresses, a desired memory cartridge can be identified from a large number of memory cartridges 3.

It should be noted that a 19-inch rack is used as the rack, for example. The 19-inch rack is a standardized rack to intensively accommodate a plurality of devices. In the rack, horizontal intervals of screws of a supporting column for attaching devices are determined to be 19 inches. The 19-inch rack is widely used to accommodate a communication device, a video device, an audio device, and the like. Actually, as shown in FIG. 4, a large-scale rack system is established by using a large number of rack systems.

In the case where a large-scale rack system is configured by using a large number of rack systems, since the number of stored memory cartridges 3 is also large, it takes a lot of time and effort to check the statuses of the memory cartridges 3. In this regard, it may be possible to provide a status check alert 25 to the rack as shown in FIG. 4, as a function of periodically inspecting a data holding state and reproduction performance of a non-volatile semiconductor memory 313 accommodated in the memory cartridge 3 and providing a notification of the obtained state to the outside. Additionally, it may be possible to provide a notification alert 26 to the memory cartridge 3 in order to provide a user with a notification on the position of a memory cartridge 3 in a problematic state.

1-2. Configuration of Memory Cartridge

Figure 5A:
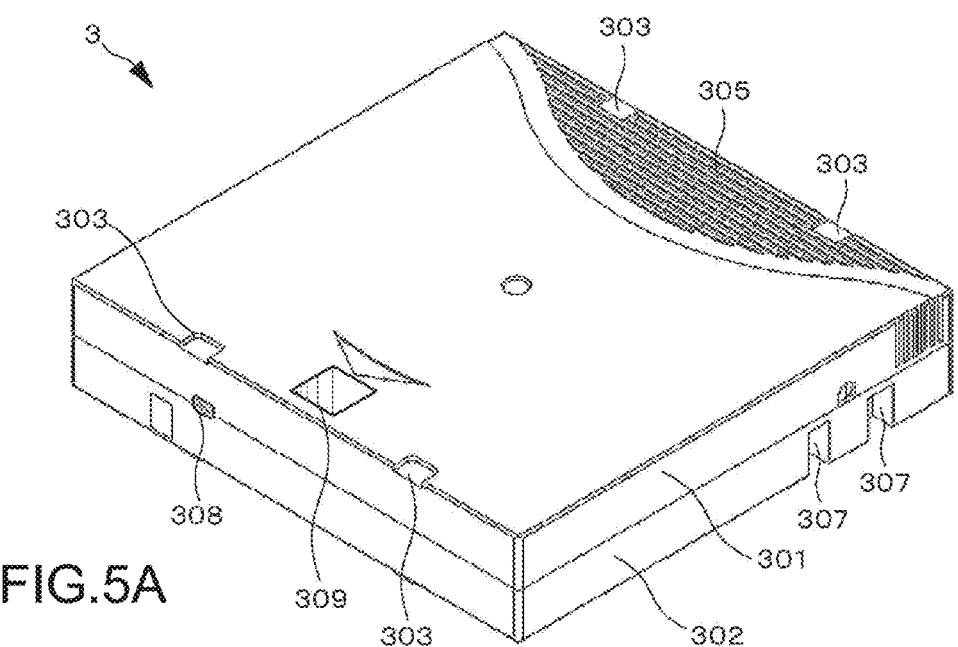
FIG. 5A is a top perspective view of a memory cartridge.
Figure 5B:
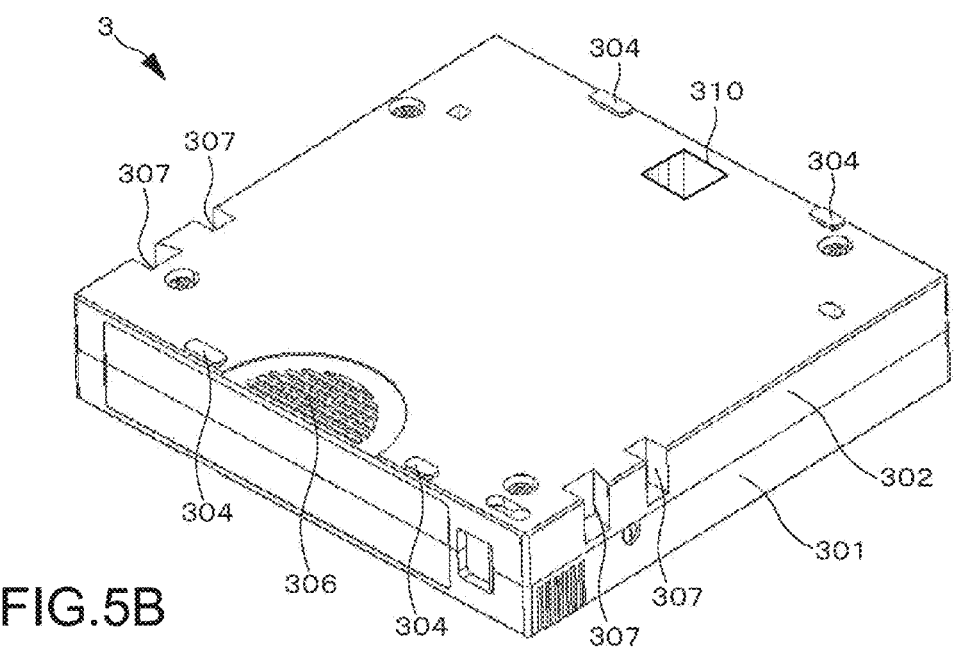
FIG. 5B is a bottom perspective view of the memory cartridge.

Next, description will be given on the configuration of the memory cartridge 3 serving as a recording apparatus. FIGS. 5A and 5B are views each showing an outer configuration of the memory cartridge 3. FIG. 5A is a top perspective view of the memory cartridge 3 and FIG. 5B is a bottom perspective view thereof.

The memory cartridge 3 is formed into a substantially cuboid shape by an upper case 301 and a lower case 302. A total of 4 stacking positioning concave portions 303 are formed in the front and back of the upper case 301. The stacking positioning concave portions 303 are formed so as to notch ends of the upper case 301. Further, 4 stacking positioning convex portions 304 are provided, in the same quantity as the stacking positioning concave portions 303, to the front and back of a bottom surface of the lower case 302.

It should be noted that the number of stacking positioning concave portions 303 and that of stacking positioning convex portions 304 are not limited to four.

The positions of the stacking positioning concave portions 303 and those of the stacking positioning convex portions 304 correspond to each other, and when the memory cartridges 3 are stacked on each other, the stacking positioning convex portions 304 of the memory cartridge 3 located above are inserted into the stacking positioning concave portions 303 of the memory cartridge 3 located immediately below. With this, the positions of the stacked memory cartridges 3 are fixed.

An upper non-slip portion 305 is formed on the upper case 301. Further, a lower non-slip portion 306 is formed on the bottom surface of the lower case 302. Each of the upper non-slip portion 305 and the lower non-slip portion 306 has many fine asperities, which prevent the memory cartridge 3 from slipping from the hand of a user when the user pulls out the memory cartridge 3 from the rack, for example.

Further, a plurality of notch portions 307 are formed over the bottom surface and the side surfaces of the lower case 302. The notch portions 307 are used for positioning the memory cartridge 3 when being accommodated in the rack or for fixing the memory cartridge 3 within the rack in a stable state.

A communication opening 308 is provided in the front side surface of the memory cartridge 3. A cable that connects the memory cartridge 3 and the waveguide 4 serving as a bus is inserted into the communication opening 308.

Furthermore, an upper waveguide insertion hole 309 into which the waveguide forming unit 501 is inserted is formed on the upper surface of the upper case 301.

Moreover, a lower waveguide insertion hole 310 into which the waveguide forming unit 501 is inserted is formed on the bottom surface of the lower case 302. The upper waveguide insertion hole 309 of the upper case 301 and the lower waveguide insertion hole 310 of the lower case 302 are formed at positions corresponding to each other in a vertical direction (in the thickness direction of the memory cartridge) such that one waveguide forming unit 501 is inserted into the upper waveguide insertion hole 309 and the lower waveguide insertion hole 310.

Figure 6:
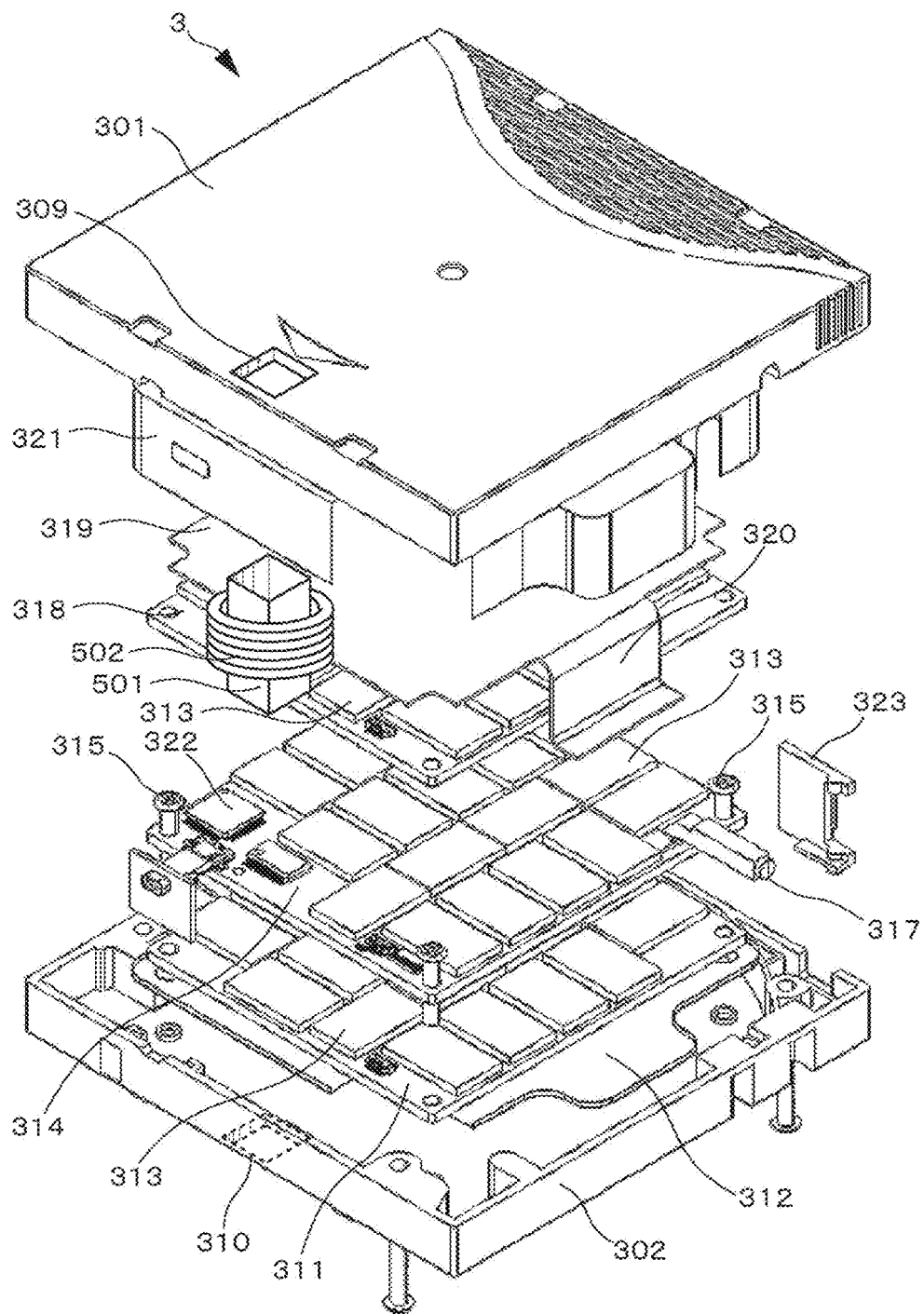
FIG. 6 is an exploded perspective view of the memory cartridge.
Figure 7:
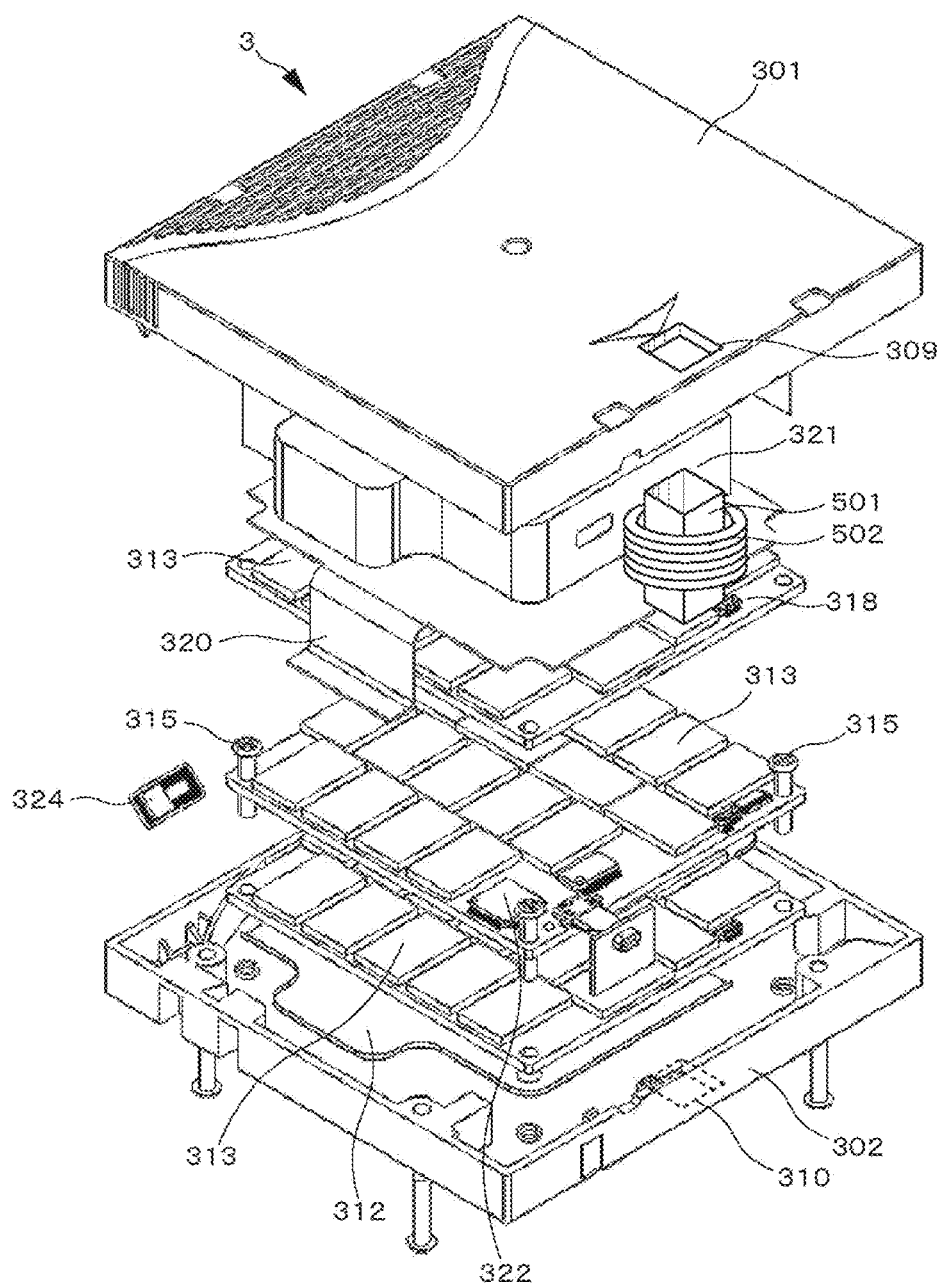
FIG. 7 is an exploded perspective view of the memory cartridge.

FIG. 6 is an exploded view of the memory cartridge 3. Further, FIG. 7 is an exploded view of the memory cartridge 3 when seen from an angle different from that of FIG. 6.

Provided in the memory cartridge 3 are a lower substrate 311, a lower unnecessary radiation shield 312, non-volatile semiconductor memories 313, an intermediate substrate 314, an optical conversion lens for auxiliary power 317, an upper substrate 318, a heat radiation sheet 319, an upper unnecessary radiation shield 321, a circuit unit 322, a Rec/UnRec switch (erroneous deletion preventing switch) 323, a non-contact tag RFID (Radio Frequency Identification) 324, and the waveguide forming unit 501.

The lower substrate 311 is provided on the bottom side within the memory cartridge 3. The lower unnecessary radiation shield 312 is provided on the lower surface of the lower substrate 311. The unnecessary radiation is unnecessary radio waves, electromagnetic waves, and an electromagnetic field generated due to a sharp change in current or voltage in an electronic apparatus, for example, and has a possibility of causing an error operation of a surrounding electronic apparatus or imparting noise to data, signals, and the like. The lower unnecessary radiation shield 312 is made of predetermined metal, for example, copper or nickel, and is provided to prevent the unnecessary radiation thereof.

The plurality of non-volatile semiconductor memories 313 are provided on the lower substrate 311. The non-volatile semiconductor memories 313 store various types of data.

Above the lower substrate 311, the intermediate substrate 314 is provided by being supported by a plurality of substrate screws 315. The non-volatile semiconductor memories 313 are provided on the intermediate substrate 314. The non-volatile semiconductor memories 313 are the same as those provided on the lower substrate 311.

A cartridge-side connector 316 for connecting the memory cartridge 3 and the waveguide 4 is provided on the intermediate substrate 314. The connection between the memory cartridge 3 and the waveguide 4 will be described later. Further, the optical conversion lens for auxiliary power 317 is provided to the intermediate substrate 314.

Above the intermediate substrate 314, the upper substrate 318 is provided by being supported by the plurality of substrate screws 315. The non-volatile semiconductor memories 313 are provided on the upper substrate 318. The non-volatile semiconductor memories 313 are the same as those provided on the lower substrate 311 and the intermediate substrate 314.

Furthermore, the heat radiation sheet 319 is provided on the upper substrate 318. The heat radiation sheet 319 includes a pair of leg portions 320 and is provided to stand up with the leg portions 320 on the lower unnecessary radiation shield 312. Heat generated in the memory cartridge 3 is transmitted to the heat radiation sheet 319 and radiated from the heat radiation sheet 319.

The upper unnecessary radiation shield 321 is provided on the inner surface side of the upper case 301. The upper unnecessary radiation shield 321 is made of predetermined metal such as copper or nickel, like the lower unnecessary radiation shield 312 described above, and is provided to prevent the unnecessary radiation thereof.

Further, within the memory cartridge 3, the circuit unit 322 that performs processing to serve as a power-supply control unit, a memory controller, and the like is provided. Furthermore, the Rec/UnRec switch 323 is provided within the memory cartridge 3.

Additionally, as shown in FIG. 7, the non-contact tag RFID 324 is provided within the memory cartridge 3. The non-contact tag RFID 324 stores identification data unique to the individual memory cartridge 3, communicates with a readout apparatus or the like by the non-contact communication technology, and identifies the individual memory cartridge 3. Though not shown in the figures, a battery cell for supplying power to the memory cartridge 3 is also provided within the memory cartridge 3.

The waveguide forming unit 501 is formed into a tube and is provided so as to be inserted from the lower waveguide insertion hole 310 of the lower case 302 to the upper waveguide insertion hole 309 of the upper case 301. A coil 502 used for non-contact power feeding is wound to the waveguide forming unit 501. The coil 502 is formed of a litz wire made of a magnetic material such as ferrite.

The waveguide forming unit 501 forms one waveguide 4 by coupling the plurality of memory cartridges 3 in the stacked state. The waveguide forming unit 501 is formed of a dielectric material. Alternatively, in the case of a metallic waveguide, the waveguide forming unit 501 is filled with a dielectric material.

Figure 8:
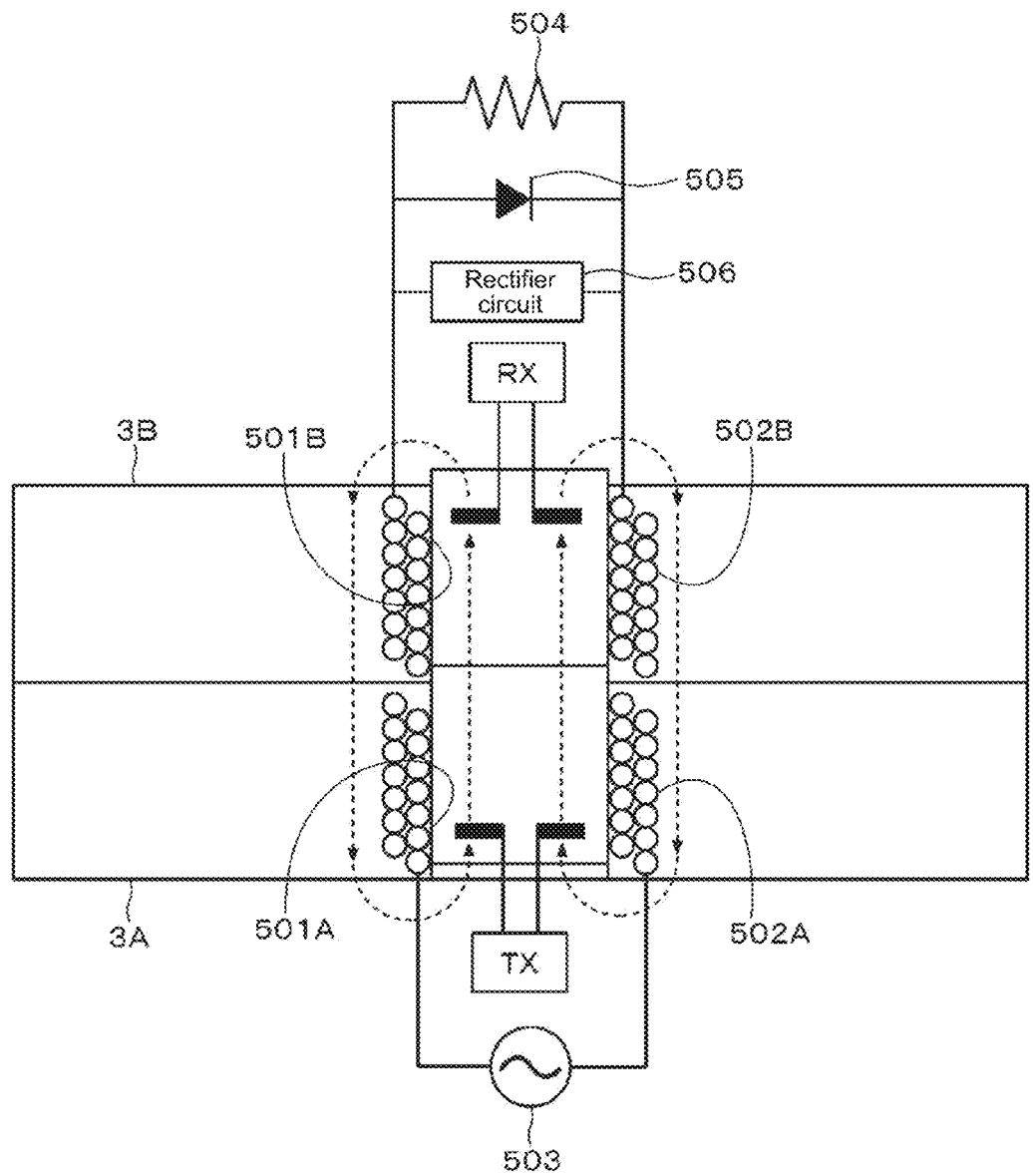
FIG. 8 is a cross-sectional view of the memory cartridges, showing a connection state of a waveguide forming unit and a configuration of a coil.

FIG. 8 is a cross-sectional view of the cartridges 3, for describing a configuration of the waveguide forming unit 501 and the coil 502. For convenience of the description, the illustration of the components other than the waveguide forming unit 501 and the coil 502 within the memory cartridge 3 is omitted.

In FIG. 8, a first memory cartridge 3A and a second memory cartridge 3B are shown as two memory cartridges stacked in a rack. Here, the first memory cartridge 3A is assumed to be a power transmission side, and the second memory cartridge 3B is assumed to be a power reception side. Note that the stacked memory cartridges are not limited to two memory cartridges, and FIG. 8 shows two memory cartridges for convenience of the description.

The first memory cartridge 3A includes a waveguide forming unit 501A. In the same manner, the second memory cartridge 3B includes a waveguide forming unit 501B. The memory cartridges are stacked on each other as shown in FIG. 8, and thus the waveguide forming unit 501A and the waveguide forming unit 501B are coupled to each other to form one waveguide 4.

The waveguide forming unit 501A is provided with a coil 502A. In the same manner, the waveguide forming unit 501B is provided with a coil 502B. The coil 502A and the coil 502B function as a power transmission coil and a power reception coil, respectively. An alternating-current (AC) source 503 that generates an alternating-current (AC) signal is connected to the coil 502A of the first memory cartridge 3A on the power transmission side. Power is transmitted to the second memory cartridge 3B in a non-contact manner through the coil 502A.

On the other hand, a resistive element 504, a diode 505, and a rectifier circuit 506 that converts the AC signal into a direct-current (DC) signal are connected to the coil 502B of the second memory cartridge 3B on the power reception side. Power is supplied from the first memory cartridge 3A in a non-contact manner through the coil 502B (power reception).

The first memory cartridge 3A and the second memory cartridge 3B are stacked on each other such that the waveguide forming unit 501A and the waveguide forming unit 501B are continued, and thus the coil 502A of the first memory cartridge 3A and the coil 502B of the second memory cartridge 3B come close to each other. The coil 502A of the first memory cartridge 3A and the coil 502B of the second memory cartridge 3B are brought close to each other to resonate with each other in a magnetic field, and thus power can be transmitted from the first memory cartridge 3A to the second memory cartridge 3B by non-contact power feeding. It is possible to use resonance to transmit power to only a resonating target. It should be noted that the non-contact power feeding includes an electromagnetic induction system and a radio wave system in addition to the magnetic field resonance system in which resonance is generated in a magnetic field so as to feed power. A different system other than the magnetic field resonance system may be adopted if it is applicable in the present disclosure.

In such a manner, the coil 502 is provided to the memory cartridge 3, and the plurality of memory cartridges 3 are coupled to each other to transmit power between the adjacent memory cartridges 3. Thus, it is possible to supply power to all the memory cartridges 3 stored in the rack.

In order to form the waveguide 4 by connection of the waveguide forming units 501 when the memory cartridges 3 are stacked on each other, it is necessary to correctly stack the memory cartridges 3 without misalignment.

Figure 9A:
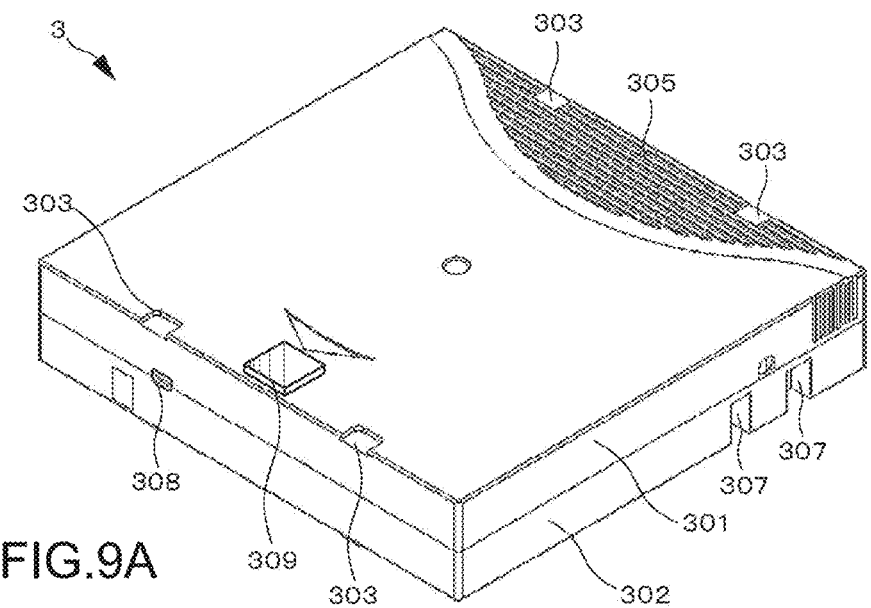
FIG. 9A is a top perspective view showing a configuration of a position fixing unit in the memory cartridge.
Figure 9B:
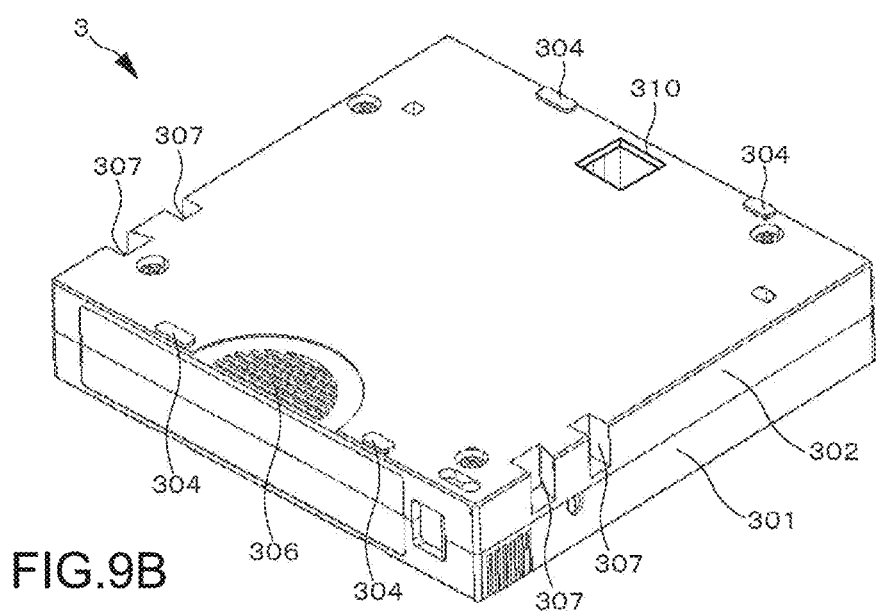
FIG. 9B is a bottom perspective view showing a configuration of a position fixing unit in the memory cartridge.

In this regard, for example, as shown in FIGS. 8 and 9, the upper end of the waveguide forming unit 501 is configured to slightly protrude from the upper case 301, and the lower end of the waveguide forming unit 501 is configured to be slightly retracted to the inside of the lower case 302.

With this configuration, when the memory cartridges 3 are stacked on each other, the upper end of the waveguide forming unit 501 of the memory cartridge 3 located below is inserted into the lower end of the memory cartridge 3 located immediately above. With this configuration, with the positions of the waveguide forming units 501 being aligned, the memory cartridges 3 can be stacked on each other. This mechanism corresponds to a position fixing unit in the section "What is claimed is".

The stacking positioning concave portions 303 provided to the upper case 301 and the stacking positioning convex portions 304 provided to the bottom surface of the lower case 302, which are shown in FIGS. 5A and 5B, are used for correctly stacking the memory cartridges 3 without misalignment. So, the stacking positioning concave portions 303 and the stacking positioning convex portions 304 also function as a mechanism to align the positions of the waveguide forming units 501.

It should be noted that the waveguide forming unit 501 and the circuit unit 322 or the like in the memory cartridge 3 are connected by wireless communication by microwaves or millimeter waves. So, the communication does not cause troubles due to corrosion, deterioration, and the like of electric contacts.

Figure 10:
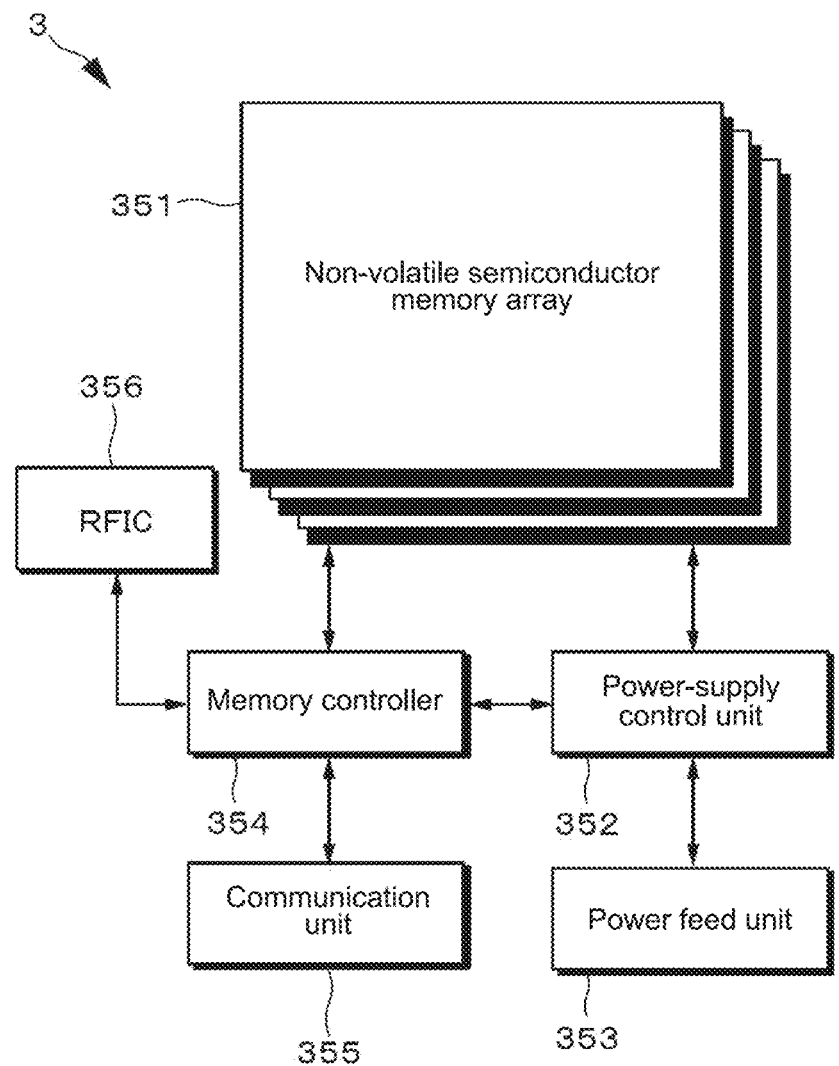
FIG. 10 is a block diagram showing a configuration of the memory cartridge.

FIG. 10 is a functional block diagram of the memory cartridge 3. The memory cartridge 3 includes a non-volatile semiconductor memory array 351, a power-supply control unit 352, a power feed unit 353, a memory controller 354, a communication unit 355, and an RFIC (Radio Frequency Integrated Circuit) 356.

The non-volatile semiconductor memory array 351 includes a plurality of non-volatile semiconductor memories. The non-volatile semiconductor memory array 351 stores various types of data.

The power feed unit 353 has a configuration for power transmission, including the coil 502, the AC source 503, the resistive element 504, the diode 505, the rectifier circuit 506, and the like for power transmission described above. The power feed unit 353 is connected to the power-supply control unit 352 in order to supply power to each unit of the memory cartridge 3. Power received by the power feed unit 353 is supplied to each unit of the memory cartridge 3 via the power-supply control unit 352. It should be noted that as an extra power source, a battery cell may be provided within the memory cartridge 3.

The memory controller 354 performs data-write processing and data-readout processing on the non-volatile semiconductor memory array 351. The memory controller 354 may further perform error detection and correction processing and the like in units of access.

The communication unit 355 includes a TX module and an RX module and communicates with the waveguide forming unit 501 that forms the waveguide 4 serving as a bus.

The RFIC 356 has a function of performing communication in a non-contact state. The RFIC 356 executes processing of receiving, by an antenna, radio waves or magnetic field output by a reader/writer serving as the other party of communication and converting them into power to output an ID (Identification Information) or the like stored in the memory to the reader/writer, or outputting data input from the outside to the memory controller 354, and the like. Further, the RFIC 356 may have a data processing function such as authentication processing using identification information such as an ID.

It should be noted that the power-supply control unit 352 and the memory controller 354 may be achieved by execution of a predetermined program by the circuit unit, for example. Further, the power-supply control unit 352 and the memory controller 354 may be achieved by not only a program but also a combination of dedicated circuits of hardware having respective functions, for example.

As described above, the memory cartridge 3 is configured.

1-3. Connection Between Bus and Recording Apparatus

Figure 11:
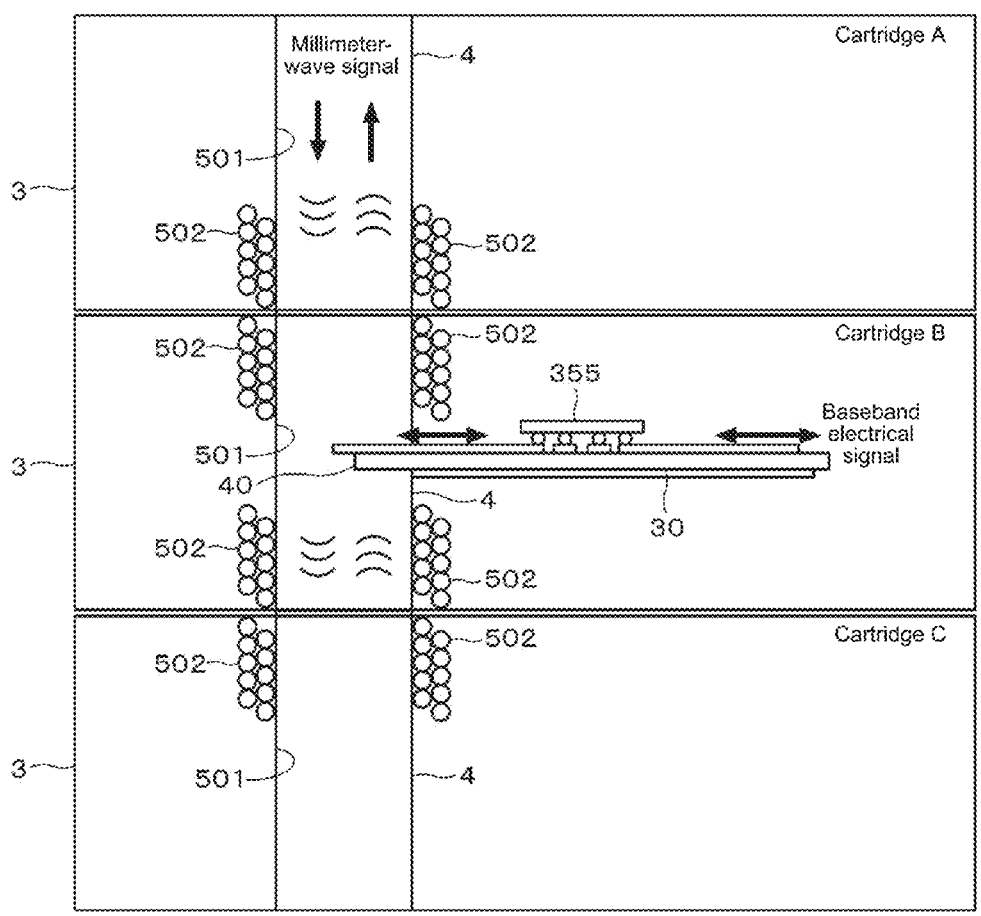
FIG. 11 is a diagram showing a first example of a connection state of a waveguide and memory cartridges.
Figure 12:
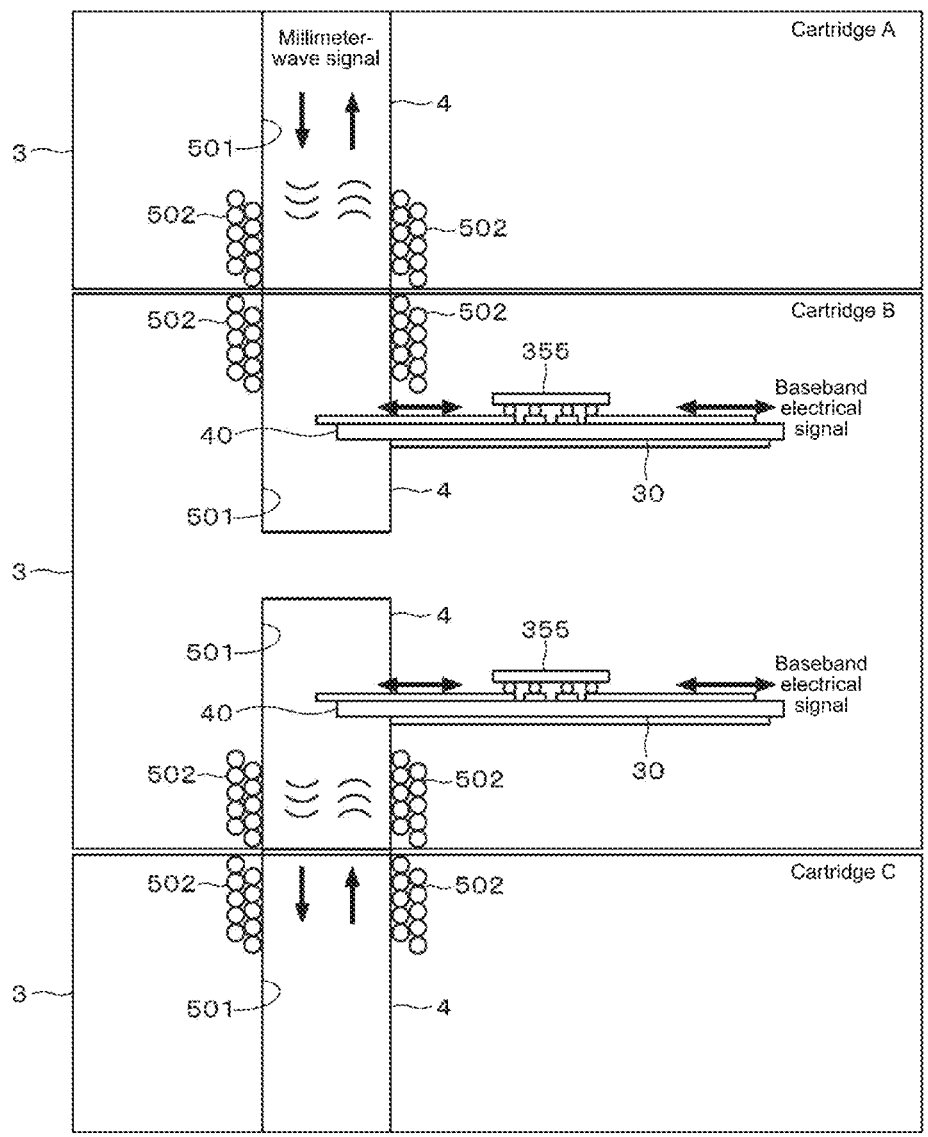
FIG. 12 is a diagram showing a second example of a connection state of a waveguide and memory cartridges.

Next, description will be given on data transmission and reception in the waveguide 4 serving as a bus and the memory cartridge 3 serving as a recording apparatus. FIG. 11 shows a state where the waveguide 4 serving as a bus is formed by stacking the plurality of memory cartridges 3 on one another and thus the data transmission and reception is allowed. Further, FIG. 12 shows a state where the waveguide 4 serving as a bus is formed by the plurality of memory cartridges 3, a cartridge B functions as a repeater, and thus the data transmission and reception between a cartridge A and a cartridge C is allowed. It should be noted that FIGS. 11, 12, and 13 each show three memory cartridges, that is, the memory cartridges A, B, and C, but the number of memory cartridges is not limited to three.

Figure 13:
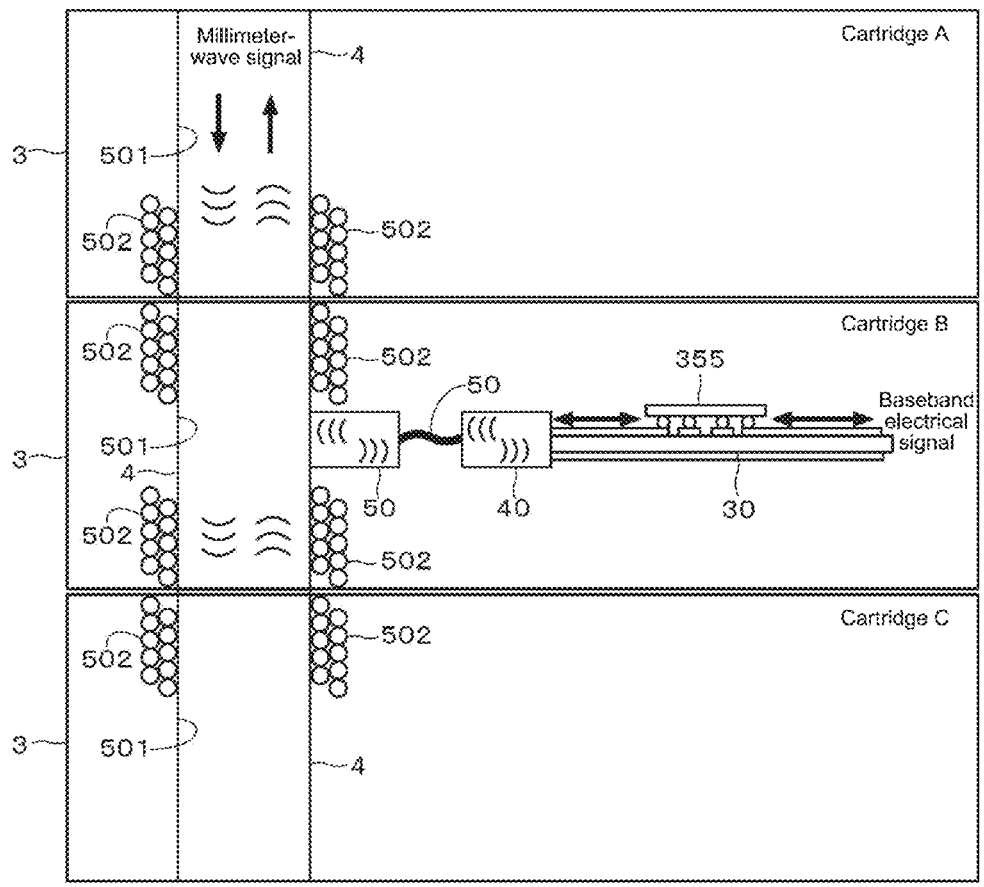
FIG. 13 is a diagram showing a third example of a connection state of a waveguide and memory cartridges.

As described above, the memory cartridge 3 includes the lower substrate 311, the intermediate substrate 314, and the upper substrate 318, but in FIGS. 11 to 13, those substrates are referred to as a substrate 30 for convenience of the description. The substrate 30 includes a coupler 40 that couples the waveguide forming unit 501 and the substrate 30.

The cartridge 3 includes the communication unit 355 including a TX module, which is a transmission module, and an RX module, which is a reception module, on the substrate 30. The TX module included in the cartridge 3 is a module to frequency-convert a baseband electrical signal into millimeter waves to be output. Data stored in the memory cartridge is output as millimeter waves to the waveguide by the TX module. Further, data transmitted as a millimeter-wave signal in the waveguide is converted into a baseband electrical signal by frequency-conversion in the RX module and is supplied to a non-volatile memory of the memory cartridge 3. In such a manner, data is transmitted through the waveguide 4 in the memory cartridge 3.

FIG. 13 shows an example in which a waveguide connecting unit 50 to connect the coupler 40 of the substrate 30 in the memory cartridge 3 and the waveguide 4 is provided, and the coupler 40 and the waveguide connecting unit 50 are connected to each other by a millimeter-wave cable 60, thus allowing data transmission and reception. The configuration becomes somewhat complicated as compared to the example of FIGS. 11 and 12, but the degree of freedom in arrangement of the substrate can be enhanced.

2. Modified Example

Hereinabove, the embodiment of the present disclosure has been specifically described, but the present disclosure is not limited to the embodiment described above and can be variously modified based on the technical idea of the present disclosure.

Figure 14:
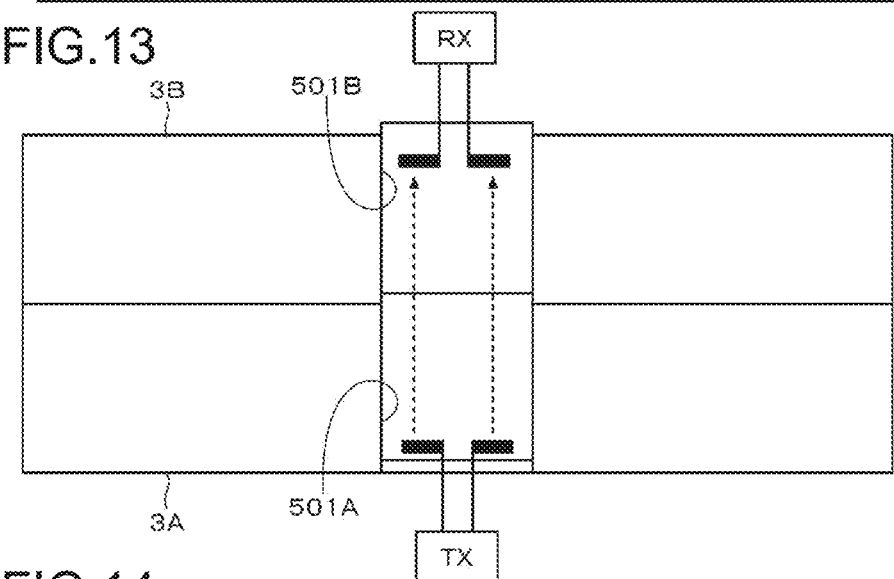
FIG. 14 is a diagram showing a waveguide forming unit according to a modified example of the present disclosure.

In the embodiment, the description has been given on the form in which the coil 502 for power feeding is provided to the waveguide forming unit 501. However, as shown in FIG. 14, it may be possible to provide a configuration in which no coils are provided in the waveguide forming unit 501. In this case, the memory cartridges are stacked on one another and the waveguide forming units 501 are connected to one another, to form one waveguide as in the embodiment descried above. In order to supply power to the memory cartridge 3, it is necessary to provide a battery cell in the memory cartridge 3.

Further, the present disclosure can have the following configurations.

(1) A recording apparatus, including:
a recording unit configured to record and hold data;
a waveguide forming unit configured to function as a transmission path that transmits the data;
a communication unit configured to communicate with the waveguide forming unit; and
a memory controller configured to control input and output of the data to and from the recording unit.

(2) The recording apparatus according to (1), in which
the waveguide forming unit is configured to be coupled to a waveguide forming unit of another recording apparatus, to form a waveguide.

(3) The recording apparatus according to (2), in which
the waveguide forming unit is configured to be coupled to waveguide forming units of a plurality of recording apparatuses stacked on one another, to form a waveguide.

(4) The recording apparatus according to any one of (1) to (3), further including a position fixing unit configured to fix a position such that the waveguide forming units are coupled to each other when the recording apparatus are stacked.

(5) The recording apparatus according to any one of (1) to (4), in which
the waveguide forming unit includes a coil for transmitting power.

(6) The recording apparatus according to any one of (1) to (5), in which
the communication unit and the waveguide forming unit communicate with each other in a millimeter-wave band.

(7) The recording apparatus according to any one of (1) to (6), in which
the communication unit and the waveguide forming unit communicate with each other in a microwave band.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus, comprising:
a storage medium configured to record and hold data;
a first waveguide section configured to be directly coupled to at least one second waveguide section of at least one other recording apparatus to form a waveguide that functions as a transmission path that transmits the data via waves that propagate in the waveguide as an electromagnetic field, wherein the first waveguide section is configured to be coupled to waveguide sections of a plurality of recording apparatuses stacked on one another, to form the waveguide;
a receiver configured to communicate the data from the first waveguide section to the storage medium;
a transmitter configured to communicate the data from the recording unit to the first waveguide section; and
a memory controller configured to control input and output of the data to and from the storage medium.

2. The recording apparatus according to claim 1, further comprising at least one stacking positioning concave portion and at least one stacking positioning convex portion configured to fix a position such that the waveguide sections are coupled to each other when the recording apparatuses are stacked.

3. The recording apparatus according to claim 1, wherein the first waveguide section includes a coil for transmitting power.

4. The recording apparatus according to claim 1, wherein the transmitter and receiver are configured to communicate the data to and from the first waveguide section in a millimeter-wave band.

5. The recording apparatus according to claim 1, wherein the transmitter and receiver are configured to communicate the data to and from the first waveguide section in a microwave band.

6. The recording apparatus of claim 1, in combination with the at least one other recording apparatus.

7. The recording apparatus of claim 6, wherein the first waveguide section is directly coupled to the at least one second waveguide section to form the waveguide.

\* \* \* \* \*